(12) United States Patent
Kannari

(10) Patent No.: US 10,719,140 B2
(45) Date of Patent: Jul. 21, 2020

(54) INPUT ASSISTANCE DEVICE AND DRAWING SYSTEM

(71) Applicant: Brain Magic Co., Ltd., Tokyo (JP)

(72) Inventor: Daiki Kannari, Tokyo (JP)

(73) Assignee: Brain Magic Co., Ltd., Tokyo (JP)

( * ) Notice: Subject to any disclaimer, the term of this patent is extended or adjusted under 35 U.S.C. 154(b) by 0 days.

(21) Appl. No.: 16/078,669

(22) PCT Filed: Feb. 24, 2017

(86) PCT No.: PCT/JP2017/006975
§ 371 (c)(1),
(2) Date: Aug. 22, 2018

(87) PCT Pub. No.: WO2017/146185
PCT Pub. Date: Aug. 31, 2017

(65) Prior Publication Data
US 2019/0050069 A1     Feb. 14, 2019

(30) Foreign Application Priority Data
Feb. 25, 2016 (JP) ................... 2016-033843

(51) Int. Cl.
*G06F 3/0338* (2013.01)
*G06F 3/038* (2013.01)
(Continued)

(52) U.S. Cl.
CPC ........... *G06F 3/0338* (2013.01); *G05G 9/047* (2013.01); *G06F 3/038* (2013.01); *G06F 3/0383* (2013.01);
(Continued)

(58) Field of Classification Search
None
See application file for complete search history.

(56) References Cited

U.S. PATENT DOCUMENTS 6,805,020 B2   10/2004   Onodera
9,377,947 B2    6/2016   Sliger
(Continued)

FOREIGN PATENT DOCUMENTS

JP     2001265532 A    9/2001
JP     2004348608 A   12/2004
JP     2011051427 A    3/2011

*Primary Examiner* — Kenneth B Lee, Jr.
(74) *Attorney, Agent, or Firm* — Alan D. Kamrath; Karin L. Williams; Mayer & Williams PC

(57) ABSTRACT

Provided is an input assistance device that generates multiple signals without removal of a hand from a rotating body. This input assistance device 10 is equipped with: an operation unit having a shaft 2 that tilts in multiple directions from a neutral position and a rotating body 3 that rotates with respect to the shaft 2; a first sensor 5 that detects the tilt direction of the shaft 2; a second sensor 6 that detects the rotational angle of the rotating body 3; and a signal generation unit 9 that generates signals using the detection result from the first sensor 5 and the detection result from the second sensor 6. Multiple signals can be generated by means of the signal generation unit 9 by selecting the type of signal on the basis of the tilt direction of the shaft 2 as detected by the first sensor 5 and adjusting the size of the signal on the basis of the rotational angle of the rotating body 3 as detected by the second sensor 6.

17 Claims, 10 Drawing Sheets

(51) Int. Cl.
 *G05G 9/047* (2006.01)
 *G06T 11/60* (2006.01)
(52) U.S. Cl.
 CPC ..... *G05G 9/04792* (2013.01); *G05G 9/04796* (2013.01); *G06T 11/60* (2013.01)

(56) References Cited

U.S. PATENT DOCUMENTS

| | | | |
|---|---|---|---|
| 9,613,444 B2* | 4/2017 | Makino | G06F 3/04845 |
| 9,880,734 B2 | 1/2018 | Sliger | |
| 2002/0148317 A1* | 10/2002 | Onodera | G05G 9/047 74/471 XY |

* cited by examiner

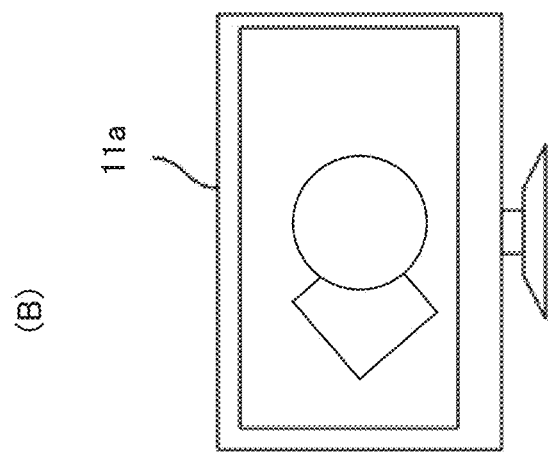
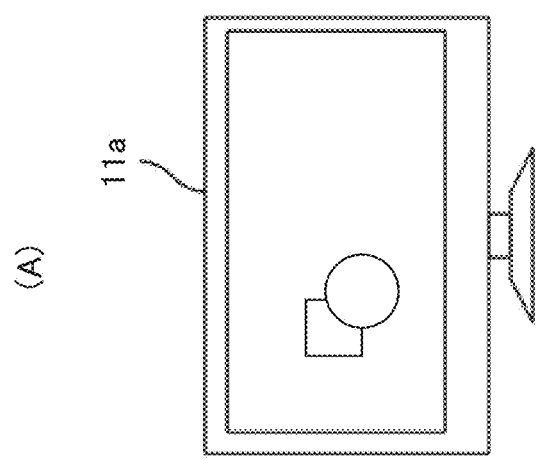
FIG. 10

INPUT ASSISTANCE DEVICE AND DRAWING SYSTEM

FIELD OF THE INVENTION

The present invention relates to an input assistance device for generating control signals corresponding to a control objective and a drawing system equipped with the input assistance device.

BACKGROUND OF THE INVENTION

When drawing on a computer (making image data), user draws with one hand by way of a pen table and a mouse, etc. As desiring to zoom in or out an image or a part of the image (referred as "object" hereafter), to move and rotate the object, and to change drawing tool, the user can only click icon(s) displayed in drawing software or type keyboard without using an indicator device, thus causing inconvenient operation with hand(s).

It is efficient to draw with one hand by using the indicator device and to edit illustration with the other hand by ways of other devices. Typically, the one hand is user's right hand and the other hand is user's left hand, the device operated by the other hand is called as a left-hand auxiliary input device (or simply called as a left hand device). For example, JP 2001-265532 disclosed a method of executing rolling operation by using a combination of two devices with the two hands. When drawing by using the indicator device and operating assistance device simultaneously, an input assistance device is operated with a left hand.

As desiring to rotate the object, it is essential to rotate the object at each 45 degrees by using the keyboard (such as determining a rotating angle according to a pressing time), but such an operation is not executed easily. So, a rotating body and a rotary encoder are provided in the input assistance device, wherein the rotary encoder is configured to adjust the rotating angle. Accordingly, it is efficient to draw by way of the rotary encoder.

The input assistance device has some functions, such as zooming in or out of the object, a size change of a brush, and a color density change of the brush, but these functions cannot be selected based on types of signals.

To change multiple drawing functions, a number of rotary encoders corresponding to the multiple drawing functions is required. Alternatively, a sole rotary encoder matches with multiple selective buttons so as to realize multiple drawing functions. However, the user has to remove his/her one hand from the rotary encoder when changing the multiple drawing functions, thus causing troublesome operation.

The present invention has arisen to mitigate and/or obviate the afore-described disadvantages.

SUMMARY OF THE INVENTION

The primary aspect of the present invention is to provide an input assistance device which generates multiple signals without a removal of user's hand from a rotating body.

The input assistance device of the present invention generates control signals corresponding to a control objective and contains a shaft of an operation portion which is tilted in multiple directions from the neutral position, the shaft is connected with the rotating body; a detection portion configured to detect the tilting directions (i.e., a first detection result) and the rotating angles (i.e., a second detection result), wherein the input assistance device generates the signals based on the first and second detection results.

Preferably, the shaft and a part of the detection unit are connected to form a control lever, wherein the part of the detection unit is configured to detect the first detection result, and the rotating body and the other part of the detection portion rotate and are connected to form a rotary encoder, wherein the other part of the detection portion is configured to detect the second detection result. Thereby, the shaft and the rotating body are operated without a removal of hand from the rotating body. Signals of the shaft and the rotating body are processed in the generating means.

Preferably, the signal generation unit selects the types of signals in accordance with the first detection result and adjusts the signals according to the second detection result.

Preferably, the types of the signals are selected from the tilting directions of the shaft as the first detection result by using the signal generation unit, and the signals are adjustable according to the rotation angles of the rotating body as the second detection result. Thereby, signals corresponding to the detection results are generated, and the rotation angles of the rotating body can be selectively used. Since the type of signals is selected according to the tilt directions of the shaft body, it is easy for the user to indicate the type of the signals.

Preferably, the detection unit may further detect a third detection result which is a tilting angle of the shaft, wherein the signal generation unit selects the type of the signals using the detection results of the tilting directions when the tilt angles exceeds the critical angle.

Preferably, it is possible to take the critical angle sufficiently and select the type of the signals when the user has performed the tilting operation.

Preferably, the signal generation unit selects the type of the signals by using the tilt directions immediately before the tilting angle is less than the tilting angles.

Preferably, the user can continue the type of the signal instructed once even if returning the tilt. It is easy to use for users who prefer to operate rotating bodies without tilting.

Preferably, the device of the present invention contains adjustment means for restricting tilting of the shaft in a tilting direction which does not correspond to the type of the signals in a manner that is equal to or more than the critical angle and not tiltable.

Preferably, the adjustment means regulates the tilting of the shaft in a tilt direction which does not correspond to the type of the signals beyond a critical angle or more and is not tiltable. The user can select the type of the signals without mistake depending on the tilt direction of the shaft.

Preferably, the detection unit may further detect a third detection result which is the tilting angles of the shaft body, and the signal generation device selects the type of the signals by using the tilting directions and the tilt angles.

Preferably, two or more types of signals can be allocated depending on the tilting angle in the tilting direction. More types of signals are assigned and more functions can be accommodated.

Preferably, the operation unit further includes a switch, a switch detection section for detecting opening and closing of the switch, and the signal generation unit generates the signals using the detection result to the switch.

Preferably, the user can perform an operation requiring non rotating angle (for example, cancel (UNDO), redo (REDO), redo, color) by operating the switch.

The drawing system of the present invention contains: an input assistance device and a pen tablet.

The input assistance device includes the generating unit selects the editing content of drawing input by the pen tablet according to the first detection result and controls the selected editing content according to the second detection result and generates a signal.

Preferably, a drawing system comprising the input assistant device of the present invention and a pen tablet. The user can draw illustrations using the pen tablet and edit the drawing using the input assistance device to create illustrations efficiently.

Preferably, an input assistance device is configured to generate signals for controlling an objective. An operation unit contains: a shaft moved in multiple directions from a neutral position and a rotating body connected to the shaft at one end and rotating with respect to the shaft;

a detection unit configured to detect a fourth detection result which is moving directions of the shaft and a second detection result which is rotating angle of the rotation body;

a signal generation unit configured to generate signals by using the fourth detection result and the second detection result; and a monitor.

The function of the control lever includes the shaft and the portion that detects the fourth detection result among the detection unit, and the rotary body and the portion that detects the second detection result among the detection unit, The function of the encoder is configured. It is possible to operate the shaft and the rotating body without grasping the rotating body with the other hand and removing the hand. Signals of the shaft and the rotating body are processed by the signal generation unit.

Preferably, the signal generating unit selects the type of the signals in accordance with the fourth detection result and adjusts the signal according to the second detection result.

Preferably, the type of the signals is selected from the moving directions of the shaft as the fourth detection result by the signal generation unit, and the signals are adjustable according to the rotating angles of the rotation body as the second detection result. Thereby, the signals corresponding to the number of types of signals are generated, and the rotating angles of the rotating body can be selectively used. Since the type of signals is selected according to the moving directions of the shaft, it becomes easy for the user to indicate the type of the signals.

Preferably, the detection unit may further detect a fifth detection result that is a moving distance of the shaft.

The signal generation unit selects the type of the signals by using the detection result of the moving direction when the moving distance exceeds the critical distance.

Preferably, it is possible to take a sufficiently large critical distance and to select the type of the signals when the user executes moving operation.

Preferably, the detection unit may further detect a fifth detection result that is a moving distance of the shaft.

The signal generation unit selects the type of the signals by using the moving directions and the moving distances.

Preferably, two or more types of signals can be allocated depending on the moving distances in the first moving directions. More types of signals are assigned and more functions can be accommodated.

Preferably, the operation unit further includes a switch, wherein a detection section for detecting opening and closing of the switch; the generation unit further generates the signals using the detection result to the switch.

Preferably, the user can execute an operation requiring no rotating angle (for example, cancel (UNDO), redo (REDO), redo, color) by operating the switch.

A drawing system of the present invention contains: an input assistance device and a pen tablet.

The Input Assistance Device Contains:

the signal generating unit configured to select the editing content of drawing input by the pen tablet according to the fourth detection result and controls the selected editing content according to the fifth detection result and generates the signal.

According to these aspects, there is provided a drawing system containing the input assistant device of the present invention and the pen tablet. The user can draw illustrations using the pen tablet and edit the drawing using the input assistance device to create illustrations efficiently.

Thereby, the input assistance device of the present invention is capable of generating multiple signals without a removal of hand from the rotating body.

Furthermore, the drawing system of the present invention is capable of drawing efficiently.

BRIEF DESCRIPTION OF THE DRAWINGS

FIG. 10 is a side plan view showing the operation of the drawing system according to the fourth embodiment of the present invention.

DETAILED DESCRIPTION OF THE PREFERRED EMBODIMENTS

Embodiments of the present invention are described as follows.

Figure 1:
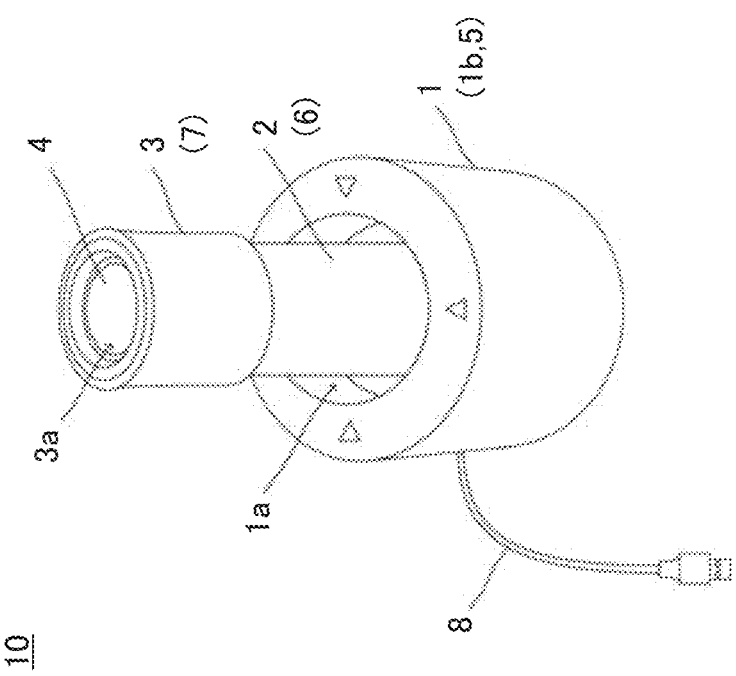
FIG. 1 is a perspective view showing the assembly of a control element of an input assistance device according to a first embodiment of the present invention.

With reference to FIG. 1, an input assistance device 10 according to a first embodiment of the present invention is operated by user independently to generate signals configured to control an objective, and the input assistance device 10 comprises: an operation unit 1, a shaft 2, a first sensor 5, a rotating body 3, a second sensor 6, a switch 4, a detection unit 7, a universal serial bus (USB) cable 8, and a signal generation unit 9. In addition, front, rear, left, and right sides of FIG. 1 are referred to as front, rear, left, and right, respectively.

The operation unit 1 is configured to accommodate the shaft 2 and is made of resin in a cylinder shape, a width of the operation unit 1 is more than a height of the operation unit 1, and the operation unit 1 includes a cavity 1a formed on a center of a top thereof and a supporter (not shown) housed in the operation unit 1, wherein the supporter (not shown) has multiple components configured to obliquely support the shaft 2 in the cavity 1a, and the supporter has a support element (not shown), a biasing element (not shown), and a control element 1b.

The support element is configured to hold a bottom of the shaft 2 and is tilted on a center of a bottom of the operation unit 1, for example, the support element is a holding plate configured to hold a recess or a spherical knob of the shaft 2.

The biasing element is configured to push the shaft 2 into a neutral position, and the neutral position is located in and extends along the cavity 1a of the operation unit 1 vertically, wherein the biasing element is a spring.

Figure 2:
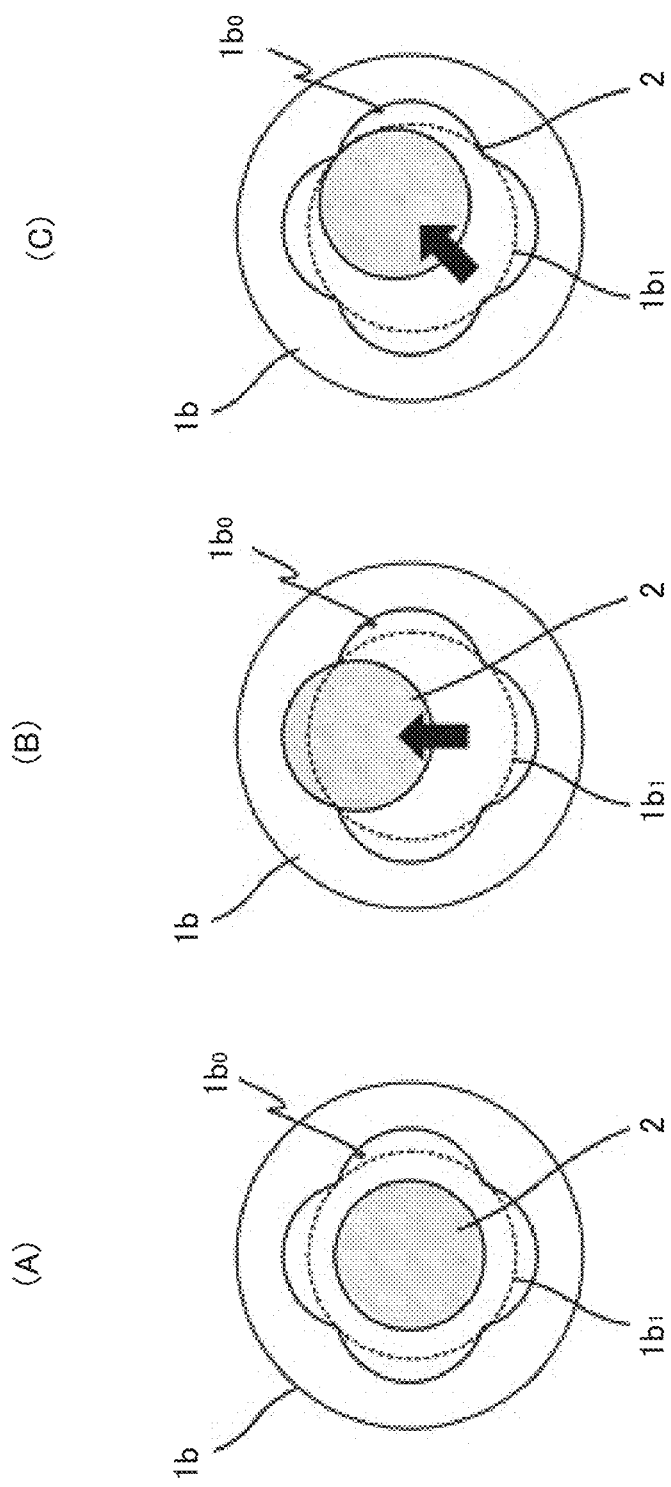
FIG. 2 is a top plan view showing the assembly of a control element of the input assistance device according to the first embodiment of the present invention.

As illustrated in FIG. 2, the control element 1b is configured to control tilting directions (such as front, rear, left, and right directions) of the shaft 2 which correspond to types of signals respectively so that the shaft 2 is not tilted over multiple critical angles. The control element 1b is a circular disc, a diameter of which is more than the width of the operation unit 1, and the control element 1b has a crisscross opening $1b_0$ for accommodating the shaft 2, wherein the control element 1b is separated from the support element (not shown) and is mounted in the operation unit 1. Each of the multiple critical angles of tilting the shaft 2 depends on a size of an inscribed circle of the crisscross opening $1b_0$ and a distance between the control element 1b and the support element (not shown).

Figure 3:
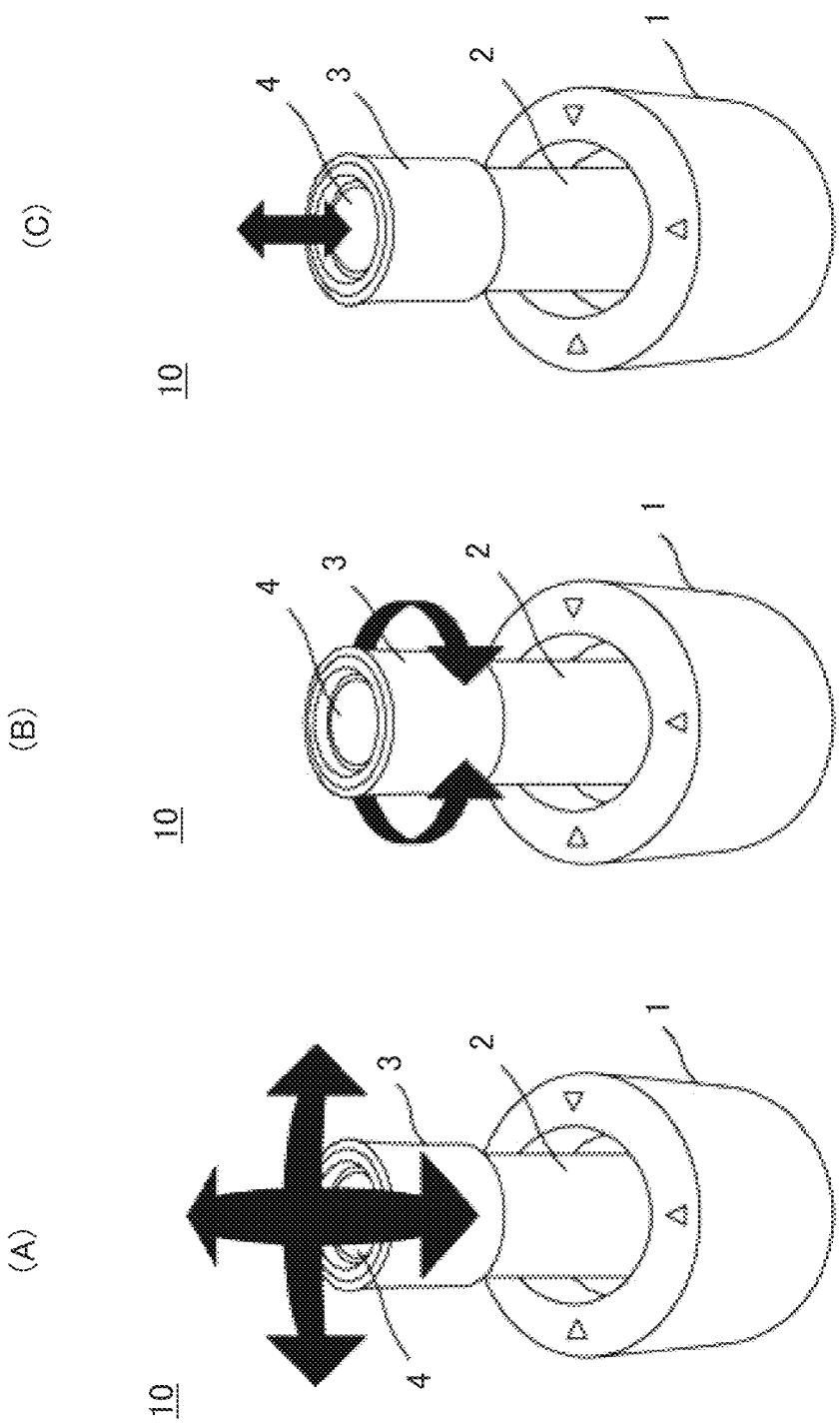
FIG. 3 is a perspective view showing the operation of the input assistance device according to the first embodiment of the present invention.

The shaft 2 is tilted from the neutral position (as shown in FIG. 2A) to a first position (as illustrated in FIG. 2B, i.e., the rear side) above the neutral position, wherein an inner rim of the crisscross opening $1b_0$ is more than the inscribed circle (i.e., each critical angles), and the shaft 2 is moved close to an upper rim of the control element 1b. The shaft 2 is also moved close to a lower rim (i.e., the front side), a left rim (i.e., the left side) or a right rim (i.e., the right side) of the control element 1b. In contrast, when the shaft 2 is tilted from the neutral position (as shown in FIG. 2A) to a right beveled surface (as illustrated in FIG. 2C), and the inner rim of the crisscross opening $1b_0$ does not exceed the inscribed circle (i.e., each critical angle), the shaft 2 is moved along a right beveled surface of the control element 1b. As shown in FIG. 3A, the control element 1b is tilted to the multiple critical angle in front, rear, left, right directions respectively and is not tilted over the multiple critical angles in the other directions except the front, rear, left, right directions, hence the shaft 2 is controlled to tilt in desired directions so as to select the types of the signals.

Above-mentioned description is related to the front, rear, left, right directions which correspond to the types of the signals individually. The other directions corresponding to the types of the signals are designed freely. For instance, eight directions, any two adjacent of which is 45 degrees, are available. Six directions, any two adjacent of which is 60 degrees, are available. Twelve directions, any two adjacent of which is 30 degrees, are available.

As illustrated in FIG. 3A, the shaft 2 is tilted from the neutral position to the multiple directions (such as the front, rear, left, right directions) and is made of resin in a cylinder shape, wherein a width of the shaft 2 is more than a length of the shaft 2.

The first sensor 5 is configured to detect tilting directions (a first detection result) and tilting angles (a third detection result) of the shaft 2, wherein the first sensor 5 is accommodated in the operation unit 1 and is a capacitive sensor or an optical sensor. The front, rear, left, right directions are available by measuring a distance between the shaft 2 and an inner wall of the operation unit 1 so as to acquire the tilting directions and tilting angle of each tilting direction, and the first and third detection results of the first sensor 5 are transmitted to the signal generation unit 9.

The shaft 2 and the first sensor 5 are connected to form a control lever.

Referring to FIG. 3B, the rotating body 3 is rotatably connected on a top of the shaft 2 and is made of resin in a cylinder shape, wherein a width of the rotating body 3 is more than the shaft 2, and the rotating body 3 includes a receiving groove 3a defined on a top thereof.

The second sensor 6 is configured to detect rotating angles (a second detection result) of the rotating body 3 relative to the shaft 2, and the second sensor 6 is fixed on the top of the shaft 2, wherein the second sensor 6 applies a rotary encoder and transmits the second detection result to the signal generation unit 9.

The rotary encoder is realized by the rotating body 3 and the second sensor 6.

The first sensor 5 and the second sensor 6 are connected to produce a detection structure.

The switch 4 is a circular push button and is housed in the receiving groove 3a of the rotating body 3. With reference to FIG. 3C, the user presses the switch 4 with a finger (such as a thumb) to turn off a circuit contact (ON), and the user removes the finger from the switch 4 via the biasing element (not shown) to turn on a circuit contact (OFF).

The detection unit 7 is configured to detect ON/OFF of the switch 4 and is accommodated in the rotating body 3, wherein the detection unit 7 detects ON/OFF of the switch 4 by using current or voltage resulting from turning on and of the circuit contact, and the detection unit 7 transmits a detection result to the signal generation unit 9.

The control lever, the rotary encoder, and the switch are operated on the rotating body 3 without removal of user's hand from the rotating body 3.

The USB cable 8 is electrically connected to a computer and supplies power to the first sensor 5, the second sensor 6, the detection unit 7, and the signal generation unit 9, wherein the signal is sent to the computer from the signal generation unit 9 via the USB cable 8. Alternatively, a power supply is accommodated in the operation unit 1 to replace the USB cable 8 so as to supply the power to the first sensor 5, the second sensor 6, the detection unit 7, and the signal generation unit 9. Preferably, the signal is sent to the computer from the signal generation unit 9 in a wireless manner.

Figure 4:
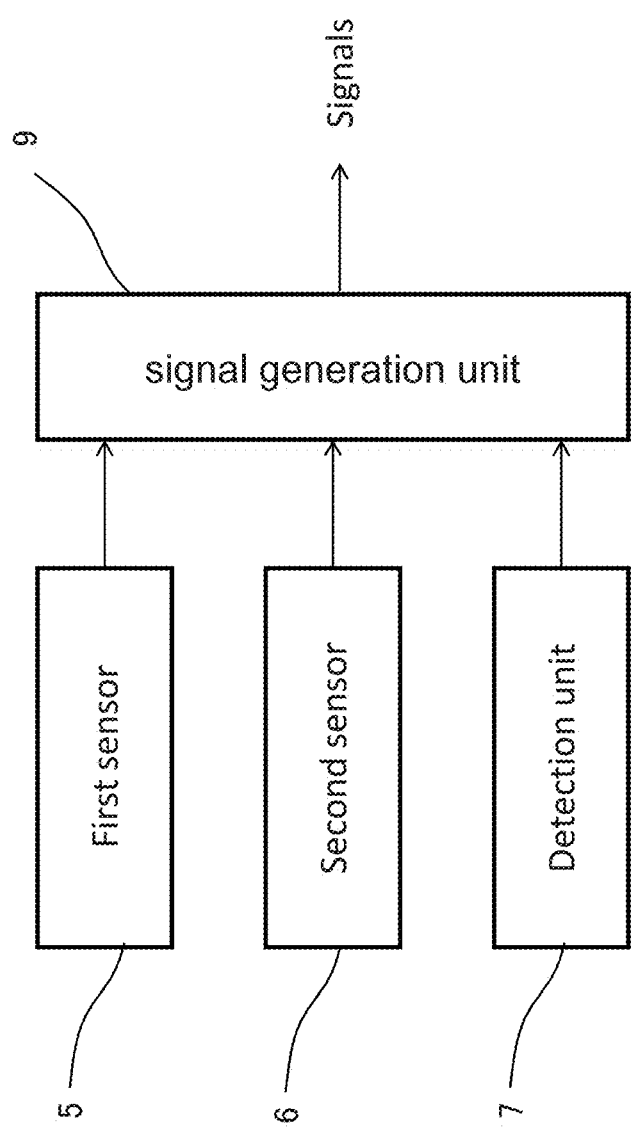
FIG. 4 is a block diagram showing a control system of the input assistance device according to the first embodiment of the present invention.

Referring to FIG. 4, a control system is the signal generation unit 9 configured to convert the detection results of the first sensor 5, the second sensor 6, and the detection unit 7 into the signals individually.

The signal generation unit 9 selects the types of the signals based on the first and third detection results of the first sensor 5 so as to adjust the second detection result of the second sensor 6 corresponding to the signal and to execute installation, zooming in, zooming out, and rotation of the object and a size change of a brush, when producing the object of illustration on the computer is executed.

The signal generation unit 9 selects the types of the signals based on the first and third detection results of the first sensor 5 and transmits the signal to execute installation, undo, redo, and color selection, when producing an object of illustration on the computer is executed.

Figure 5:
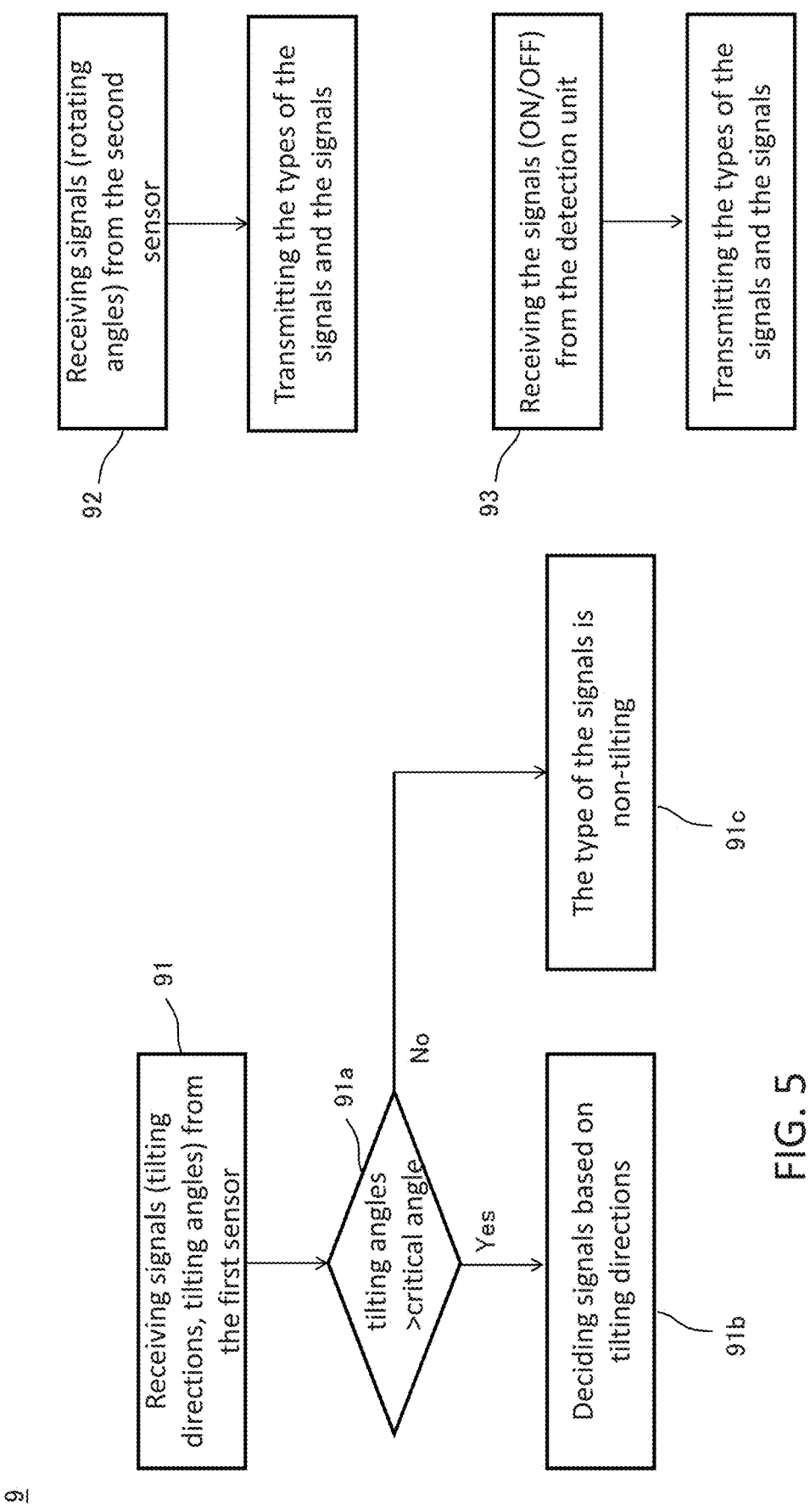
FIG. 5 is a flow chart showing the decision process of the signals according to the first embodiment of the present invention.

With reference to FIG. 5, the signal generation unit 9 executes a first process 91 corresponding to the first and third detection results of the first sensor 5, a second process 92 corresponding to the second detection result of the second sensor 6, and a third process 93 corresponding to the detection result of the detection unit 7.

The second detection result of the second sensor 6 corresponds to the second process 92, and the detection result of the detection unit 7 corresponds to the third process 93, wherein the second detection result, the detection result, and the types of the signals are sent. For example, the second detection result (i.e., the rotating angles of the rotating body 3) of the second sensor 6 and the detection result (i.e., the ON/OFF of the switch 4) of the detection unit 7 are sent. The user selects the types of the signals corresponding to the first and third detection results of the first sensor 5, wherein the second detection result of the second sensor 6 represents a level (value) of the signal, and the detection result of the detection unit 7 denotes an invalid signal.

The types of the signals corresponding to the second detection result of the second sensor 6 include zooming in and zooming out with or without the object, rotation of the object, a size change of the brush, and a color density change of the brush. The types of the signals corresponding to the detection result of the detection unit 7 include the undo, the redo, the color selection, and printing or not. The types of the signals are selected based on the tilting directions of the shaft 2 detected by the first sensor 5. The second detection result of the second sensor 6 includes the zooming in and zooming out of the object when the shaft 2 is tilted to the front side, the rotation of the object when the shaft 2 is tilted to the rear side, the size change of the brush when the shaft 2 is tilted to the left side, and the color density change of the brush when the shaft 2 is tilted to the right side. The detection result of the detection unit 7 includes the undo when the shaft 2 is tilted to the front side, the redo when the shaft 2 is tilted to the rear side, the color selection when the shaft 2 is tilted to the left side, and printing when the shaft 2 is tilted to the right side.

The computer determines whether receiving the signal, the signal generation unit 9 (the input assistance device 10) generates and transmits a first type of signal when the shaft 2 is tilted to the front side, a second type of signal when the shaft is tilted to the rear side, a third type of signal when the shaft is tilted to the left side, and a fourth type of the signal when the shaft is tilted to the right side.

The first process 91 corresponding to the first and third detection results of the first sensor 5 are described as follows:

The signal generation unit 9 determines whether the second sensor 5 is over a critical angle 91a, for example, when the tilting angle is over the critical angle 91a, a first signal type 91b is determined based on the tilting direction.

When the tilting angle is less than the critical angle 91a, a second signal type 91c is five non-tilting signals.

The other types of the signal are four signals sent by operating the switch 4 when the rotating body 3 is not tilted.

Operation functions depend on the types of the signals, such as explanation values of the rotating angles of the rotating body 3 (or the signals corresponding to the rotating angles, wherein when the rotating angles are within a specified range, the signals are sent).

The color selection is executed by operating the switch or the rotating body and includes red, orange, yellow, green, blue, indigo, and purple colors which correspond to the rotating angles of the rotating body respectively.

Thereby, the color selection, the types of the signals, and values of the rotating angle are selected by using the computer. On the other hand, a valve of the rotating angle is not transmitted. The type of the signal which corresponds to a selected color (such as red color or orange color) by using a signal selector 9 is sent.

The type of the signal corresponding to the value of the rotating angle is changeable, and at least one of the values of the rotating angle is valid.

Accordingly, the input assistance device 10 generates the multiple signals without a removal of hand so as to produce illustration efficiently.

The shaft 2 is bendable so as to design the rotating direction of the rotating body 3 freely, and the shape of the shaft 2 is changeable except cylindrical and prismatic shape, for example, the shaft 2 is radial to correspond to the type of the signal.

A difference of an input assistance device of a second embodiment from that of the first embodiment comprises a decision process of the signal.

Figure 6:
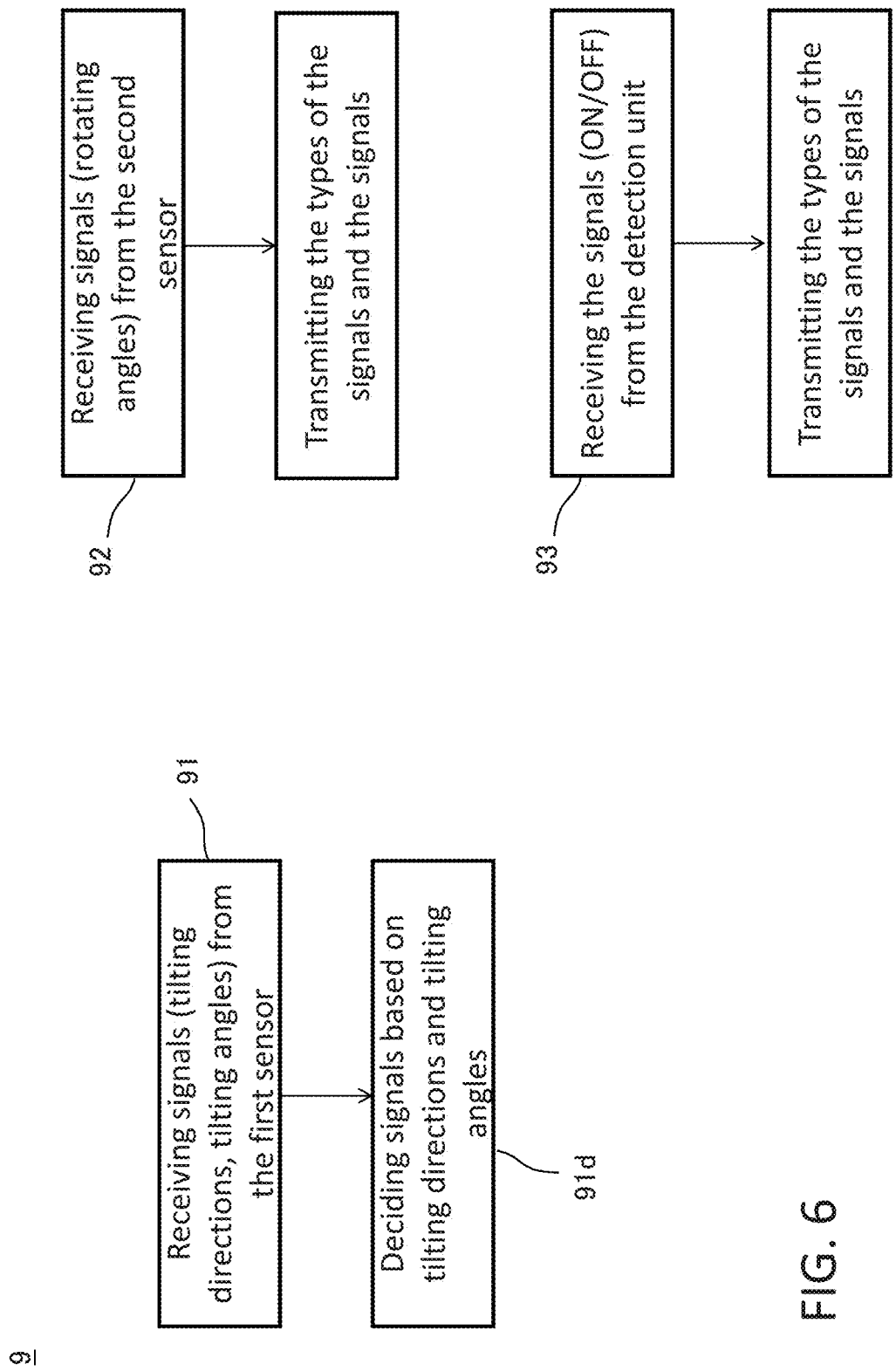
FIG. 6 is a flow chart showing the decision process of the signals according to a second embodiment of the present invention.

FIG. 6 is a flow chart showing the decision process of the signals according to the second embodiment of the present invention.

The signal generation unit 9 includes a first process 91 corresponding to the first and third detection results of the first sensor 5, a second process 92 corresponding to the second detection result of the second sensor 6, and a third process 93 corresponding to the detection result of the detection unit 7.

The second process 92 and the third process 93 of the second embodiment are identical to those of the first embodiment and are configured to transmit detected signals and the type of the signals.

The signals of the second detection result of the second sensor 6 include zooming in and zooming out of an object, rotation of the object, a size change of a brush, and a color density change of the brush. The signals of the detection result of the detection unit 7 include undo, redo, a color selection, printing or not respectively. The types of the signals are selected based on the tilting direction and the tilting angle of the shaft 2 which are detected by the first sensor 5, for instance, the signals of the second detection result of the second sensor 6 are selected. When the shaft 2 is tilted to the front side over 30 degrees, it means the zooming in and zooming out of the object. When the shaft 2 is tilted to the front side within 15 degrees to 30 degrees, it represents the rotation of the object. When the shaft 2 is tilted to the left side at 30 degrees, it denotes the size change of the brush. When the shaft 2 is tilted to the left side within 15 degrees to 30 degrees, it means the density change of the brush. Regarding the detection result of the detection unit 7, when the shaft 2 is tilted to the front side over 30 degrees, it represents undo; when the shaft 2 is tilted to the front side within 15 degrees to 30 degrees, it denotes redo; when the shaft 2 is tilted to the left side over 30 degrees, it represents the color selection; and when the shaft 2 is tilted to the left side within 15 degrees to 30 degrees, it means printing.

Thereby, the tilting direction and the tilting angle are combined to determine the types of the signals.

The input assistance device 10 generates multiple signals without a removal of the hand from the rotating body so as to produce the illustrations quickly.

To distinguish the tilting angle and the signal, the 15 degrees and the 30 degrees are used as critical values individually. In addition, more critical values are designed freely to correspond to more types of the signals.

The same effects as the first embodiment are available except above-mentioned description.

A difference of an input assistance device of a third embodiment from that of the first embodiment comprises a control lever which is movable when it is not tilted.

Figure 7:
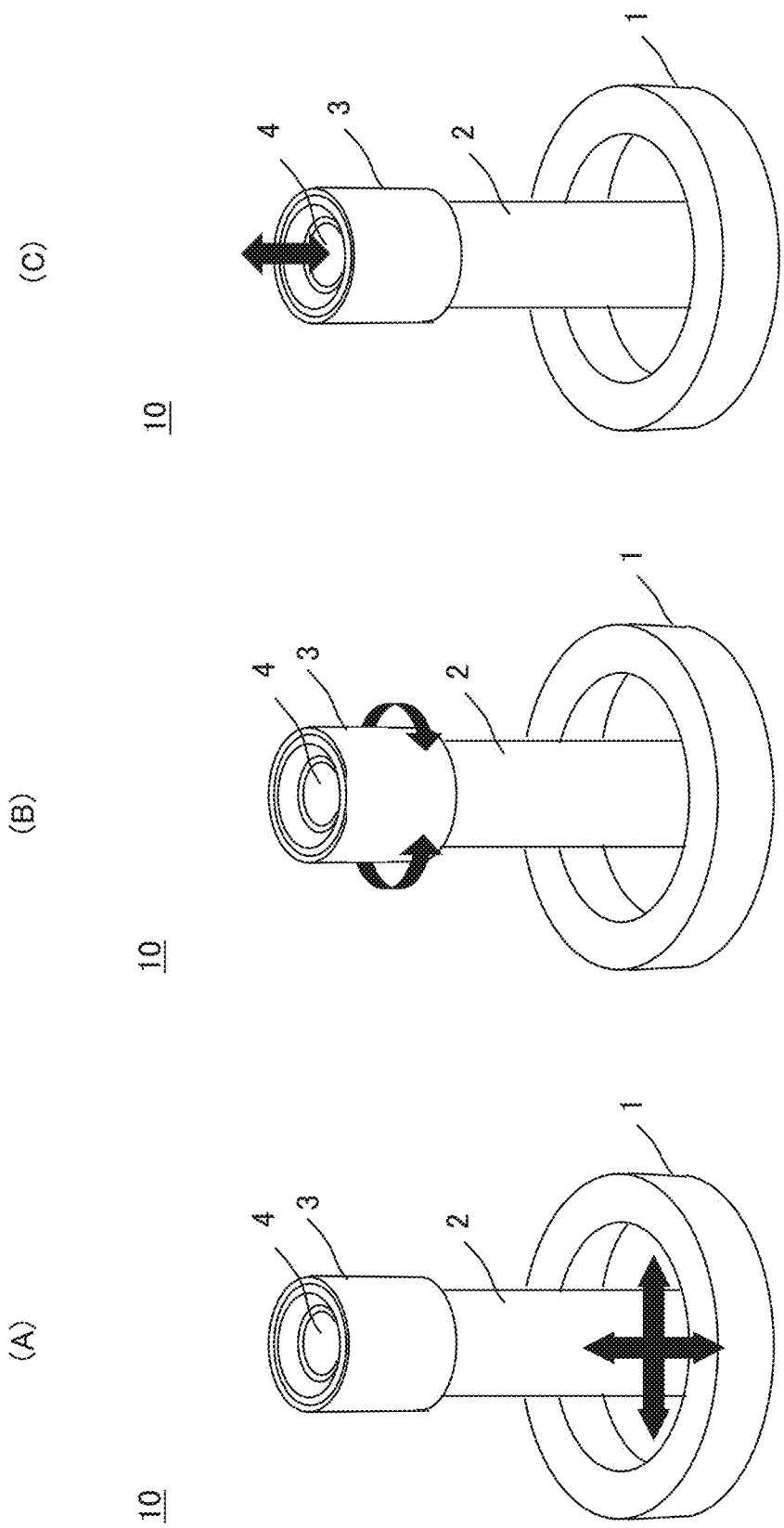
FIG. 7 is a perspective view showing the operation of an input assistance device according to a third embodiment of the present invention.

As shown in FIG. 1, the input assistance device 10 of the third embodiment is identical to the first embodiment except the shaft 2 is not tilted. In other words, a lower end of the shaft 2 is moved horizontally to the front, rear, left, and right sides from the neutral position, as illustrated in FIG. 7A.

The first sensor 5 of the third embodiment is different from the first embodiment. The first sensor 5 is configured to acquire a moving direction of the shaft 2 (i.e., a fourth detection result) and a moving distance of the shaft 2 (i.e., a fifth detection result). The first sensor 5 is accommodated in the operation unit 1 and is a capacitive sensor or an optical sensor, wherein the first sensor 5 is configured to measure a distance between the shaft 2 and the inner wall of the operation unit 1, a moving distance of the shaft 2, and multiple moving distances of the shaft 2 in multiple directions respectively. Thereafter, the fifth and fifth detection results of the first sensor 5 are transmitted to the signal generation unit 9.

Thereby, the shaft 2 and the first sensor 5 are used as the control lever.

Figure 8:
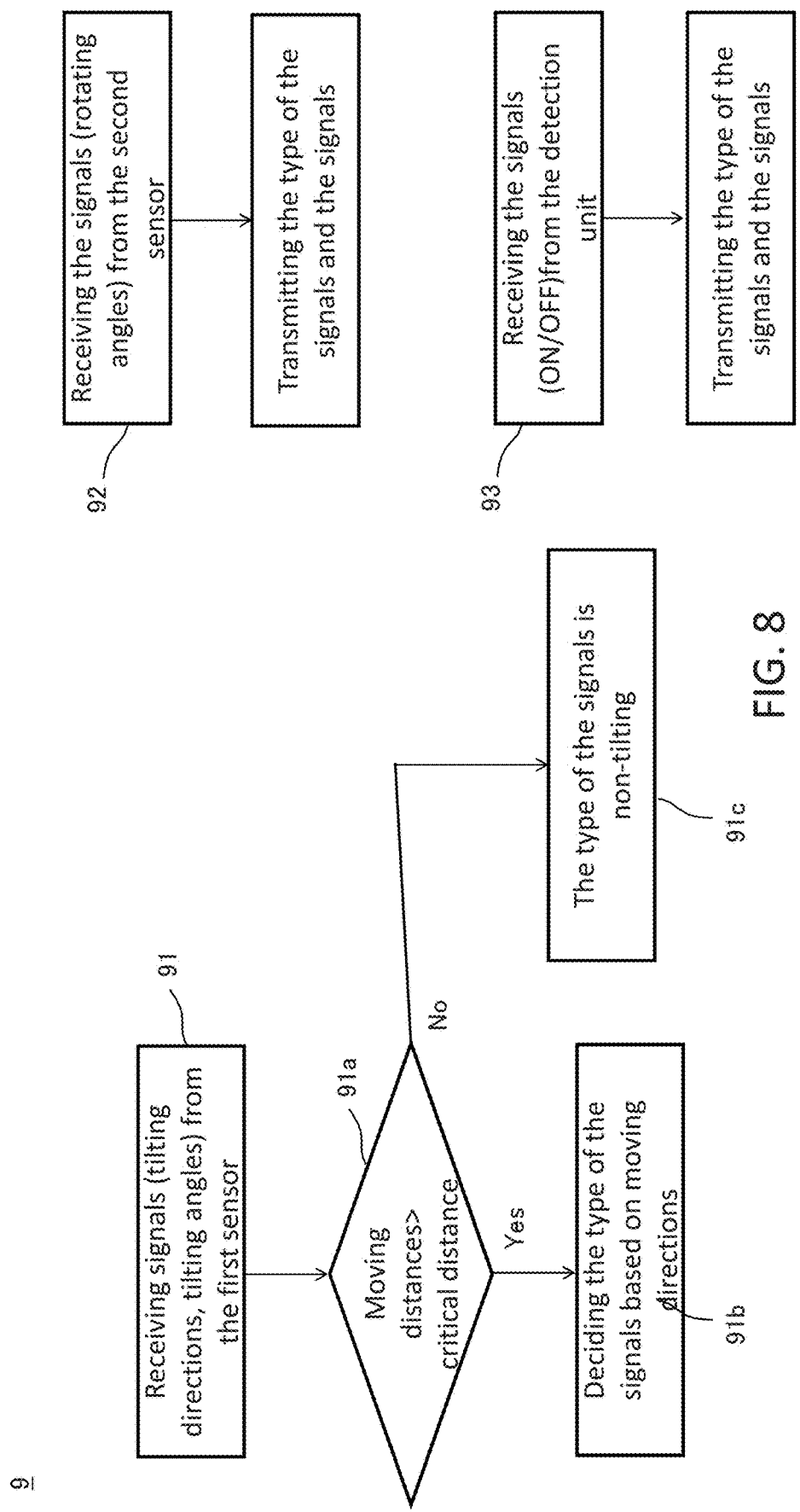
FIG. 8 is a flow chart showing the decision process of the signals according to the third embodiment of the present invention.

FIG. 8 is a flow chart showing the decision process of the signal according to the third embodiment of the present invention. The signal generation unit 9 includes a first process 91 corresponding to the fifth and fifth detection results of the first sensor 5, a second process 92 corresponding to the second detection result of the second sensor 6, and a third process 93 corresponding to the detection result of the detection unit 7.

The detected signals and the types of the signals (i.e., the rotating angle detected by the second sensor 6 and operation of the switch 4 detected by the detection unit 7) in the second process 92 and the third process 93 are sent so that the user inputs the signals.

The types of the signals corresponding to the second detection result of the second sensor 6 include zooming in and zooming out of the object, rotation of the object, a size change of a brush, and a color density change of the brush. The types of the signals corresponding to the detection result of the detection unit 7 include undo, redo, a color selection, and printing or not. The types of the signals are selected based on the moving directions of the shaft 2 detected by the first sensor 5. The second detection result of the second sensor 6 includes the zooming in and zooming out of the object when the shaft 2 is tilted to the front side, the rotation of the object when the shaft 2 is tilted to the rear side, the size change of the brush when the shaft 2 is tilted to the left side, and the color density change of the brush when the shaft 2 is tilted to the right side. The detection result of the detection unit 7 includes undo when the shaft 2 is tilted to the front side, redo when the shaft 2 is tilted to the rear side, the color selection when the shaft 2 is tilted to the left side, and printing when the shaft 2 is tilted to the right side.

The computer determines whether receiving the signal, and the signal generation unit 9 (the input assistance device 10) generates and transmits a first type of signal when the shaft is tilted to the front side, a second type of signal when the shaft is tilted to the rear side, a third type of signal when the shaft is tilted to the left side, and a fourth type of the signal when the shaft is tilted to the right side.

The first process 91 corresponding to the fifth and fifth detection results of the first sensor 5 are described as follows:

The signal generation unit 9 determines whether a moving distance of the second sensor 5 is over a critical distance 91a, for example, when the moving distance is over the critical distance 91a, a first signal type 91b is determined according to the moving direction.

When the moving distance is less than the critical distance 91a, the type of the signal is "non-moving" (i.e., a fifth signal type 91c) and is transmitted.

The four types of the signal and the "non-moving" are transmitted by operating the rotating body and the switch.

Accordingly, the input assistance device 10 generates the multiple signals without a removal of the hand so as to produce illustration efficiently.

In this embodiment, the types of the signals are determined by the moving directions and the moving distances of the shaft respectively to replace the tilting directions and the tilting angles of the second embodiment.

In a fourth embodiment, an input assistance device 10 is applicable for a drawing system. Preferably, the input assistance devices 10 of the first, second, third embodiments are adapted for the drawing system.

Figure 9:
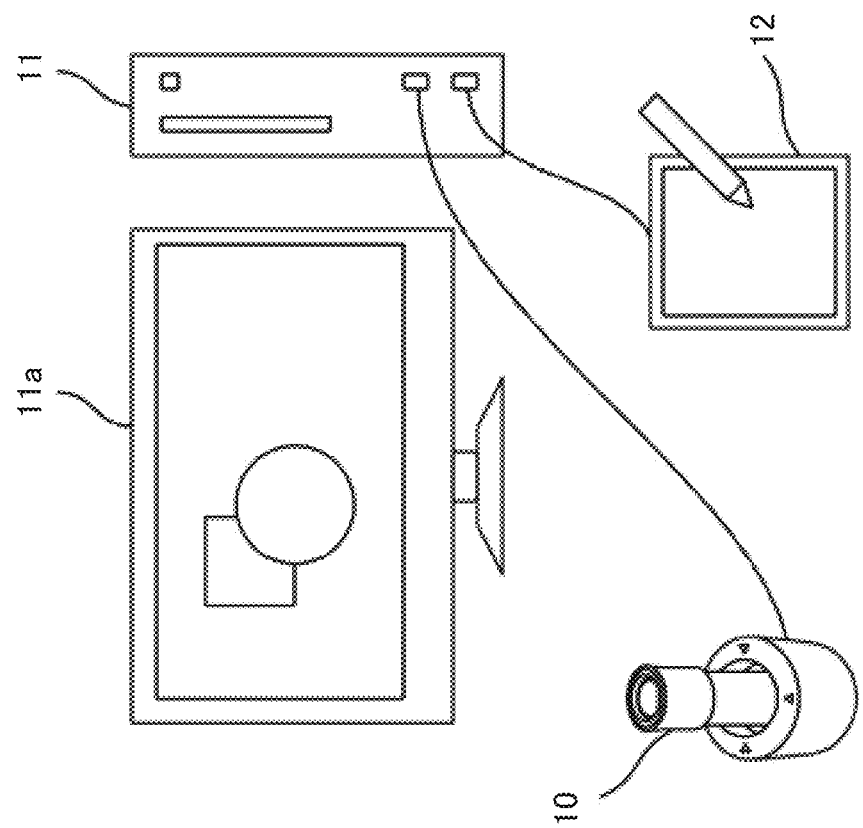
FIG. 9 is a perspective view showing the assembly of a drawing system according to a fourth embodiment of the present invention.

With reference to FIG. 9, the drawing system 20 comprises a computer 11, a monitor 11a electrically connected with the computer 11, the input assistance device 10, and a pen table 12.

The input assistance device 10 and the pen table 12 of the drawing system 20 are electrically connected with the computer 11 via a universal serial bus (USB) cable 8 so that signals are generated by operating the input assistance device 10 and the pen table 12 and are processed by the computer 11 to display objects (such as illustrations) on the monitor 11a.

Referring to FIG. 10, a target object is operated by way of the input assistance device 10, for example, the object of FIG. 10A is changed as illustrated in FIG. 10B.

When desiring to enlarge and rotate the object, the object is zoomed in and then is rotated in turn.

The rotating body 3 is pulled to the front side and the shaft 2 is tilted to the front side so as to zoom in and out the object. Then, the rotating body 3 is rotated along a clockwise direction (because the rotating body 3 is zoomed in by being rotated along the clockwise direction, and it is zoomed out along the counterclockwise direction). When the object is zoomed out to a desired size, the rotating body 2 is stopped being rotated.

Thereafter, the rotating body 3 is pushed inward and the shaft 2 is tilted to the rear side, such that the object is revolved, and the rotating body 3 is rotated to a desired position along the counterclockwise direction.

The user grasps the rotating body 3 and executes above-mentioned functions without a removal of the hand, thus enhancing operation efficiency and time.

In the drawing system 20 of this embodiment, the input assistance device 10 further includes a signal generation unit 9 arranged in the computer 11.

Thereby, it is efficient to draw the illustration by using the input assistance device 12.

The input assistance device further includes application program (such as computer programs) applicable for other systems, such as video display system, so as to fast-forward or to turn back videos by corresponding to time of rotation of the rotating body or the rotation of the rotating body.

Thereby, the input assistance device generates the multiple signals without the removal of the hand from the rotating body to produce illustration efficiently.

What is claimed is:

1. An input assistance device being operated to generate multiple signals configured to control an objective and comprising:

an operation portion, a shaft tilted in multiple directions from a neutral position, a rotating body connected with the shaft, and a detection portion configured to detect tilting directions of the shaft and tilting angles of the rotating body, wherein the tilting directions of the shaft detected by the detection portion are a first detection result, the tilting angles of the shaft detected by the detection portion are a second detection result, and the multiple signals are generated by using the first detection result and the second detection result;

wherein the multiple signals are generated by selecting one of types of the signals corresponding to the first detection result, and a level of the signals corresponding to the second detection result is adjustable, wherein the detection portion is configured to detect the tilting angles of the shaft which is a third detection result, wherein when the tilting angles are over a critical angle, the one of the types of the signals is determined based on the tilting directions, and wherein when the tilting angles are less than the critical angle, the one of the types of the signals is determined based on the tilting angles less than the tilting directions.

2. The input assistance device as claimed in claim 1, wherein the shaft is controlled to tilt when the other types of the signals do not correspond to or are over the critical angle or when the shaft is not tilted.

3. The input assistance device as claimed in claim 1, wherein the shaft is controlled to tilt when the other types of the signals do not correspond to or are over the critical angle or when the shaft is not tilted.

4. The input assistance device as claimed in claim 1, wherein the detection portion is configured to detect the tilting angles of the shaft, and the tilting angles of the shaft is a third detection result, wherein one of the types of the signals is selected based on the tilting directions and the tilting angles.

5. The input assistance device as claimed in claim 1, wherein the operation portion further includes a switch having a detection unit configured to detect ON/OFF of the switch, and the signals are generated by using detecting result of the detection unit.

6. The input assistance device as claimed in claim 1, wherein the operation portion further includes a switch having a detection unit configured to detect ON/OFF of the switch, and the signals are generated by using detecting result of the detection unit.

7. The input assistance device as claimed in claim 1, wherein the operation portion further includes a switch having a detection unit configured to detect ON/OFF of the switch, and the signals are generated by using detecting result of the detection unit.

8. The input assistance device as claimed in claim 1, wherein the operation portion further includes a switch having a detection unit configured to detect ON/OFF of the switch, and the signals are generated by using detecting result of the detection unit.

9. The input assistance device as claimed in claim 2, wherein the operation portion further includes a switch having a detection unit configured to detect ON/OFF of the switch, and the signals are generated by using detecting result of the detection unit.

10. The input assistance device as claimed in claim 3, wherein the operation portion further includes a switch having a detection unit configured to detect ON/OFF of the switch, and the signals are generated by using detecting result of the detection unit.

11. The input assistance device as claimed in claim 1 further comprising a pen table configured to input editing content of drawing corresponding to the first detection result, wherein a drawing system corresponding to signals of the editing content is controlled based on the second detection result.

12. The input assistance device as claimed in claim 1 further comprising a pen table configured to input editing content of drawing corresponding to the first detection result, wherein a drawing system corresponding to signals of the editing content is controlled based on the second detection result.

13. The input assistance device as claimed in claim 1 further comprising a pen table configured to input editing content of drawing corresponding to the first detection result, wherein a drawing system corresponding to signals of the editing content is controlled based on the second detection result.

14. The input assistance device as claimed in claim 1 further comprising a pen table configured to input editing content of drawing corresponding to the first detection result, wherein a drawing system corresponding to signals of the editing content is controlled based on the second detection result.

15. The input assistance device as claimed in claim 1 further comprising a pen table configured to input editing content of drawing corresponding to the first detection result, wherein a drawing system corresponding to signals of the editing content is controlled based on the second detection result.

16. The input assistance device as claimed in claim 3 further comprising a pen table configured to input editing content of drawing corresponding to the first detection result, wherein a drawing system corresponding to signals of the editing content is controlled based on the second detection result.

17. The input assistance device as claimed in claim 4 further comprising a pen table configured to input editing content of drawing corresponding to the first detection result, wherein a drawing system corresponding to signals of the editing content is controlled based on the second detection result.

* * * * *